May 1, 1928.
F. F. VAN TUYL
1,668,293
APPARATUS FOR ELECTRICALLY TREATING LIQUIDS
Filed Oct. 1, 1925    3 Sheets-Sheet 3
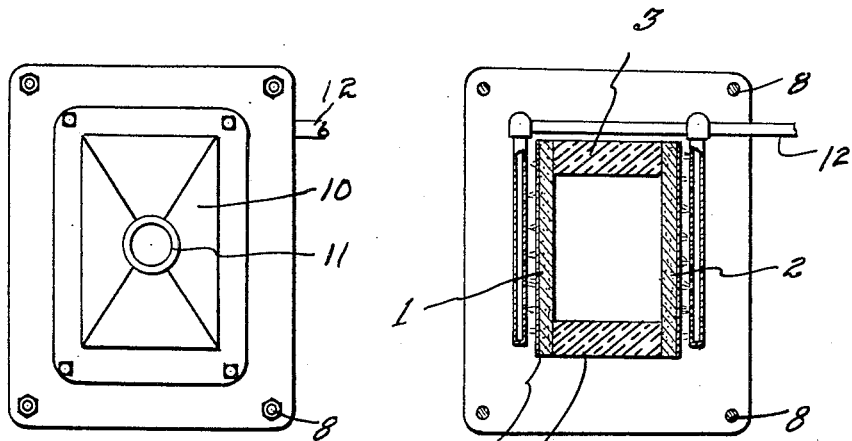
Fig. 5
Fig. 6
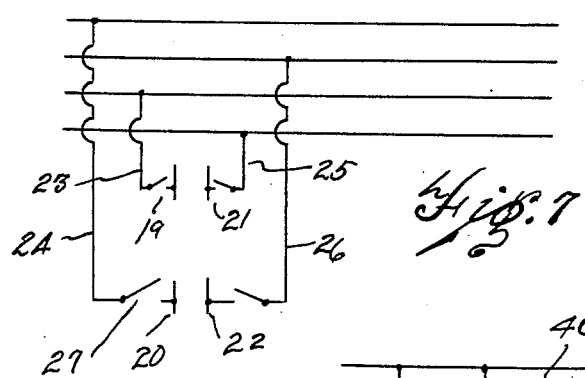
Fig. 7
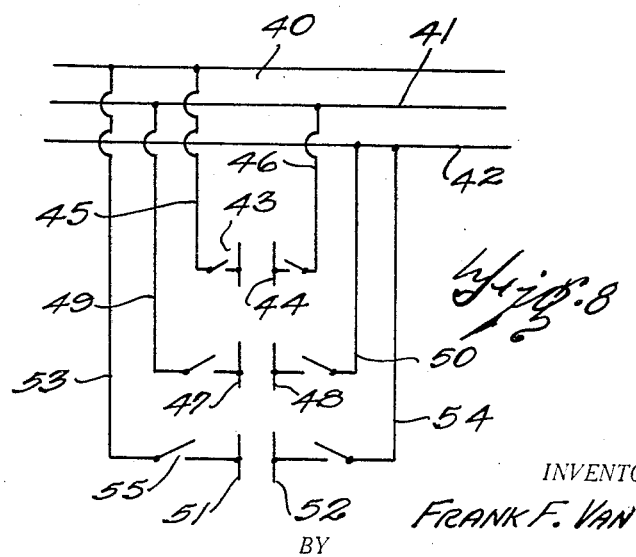
Fig. 8
INVENTOR.
FRANK F. VAN TUYL
BY
ATTORNEY.

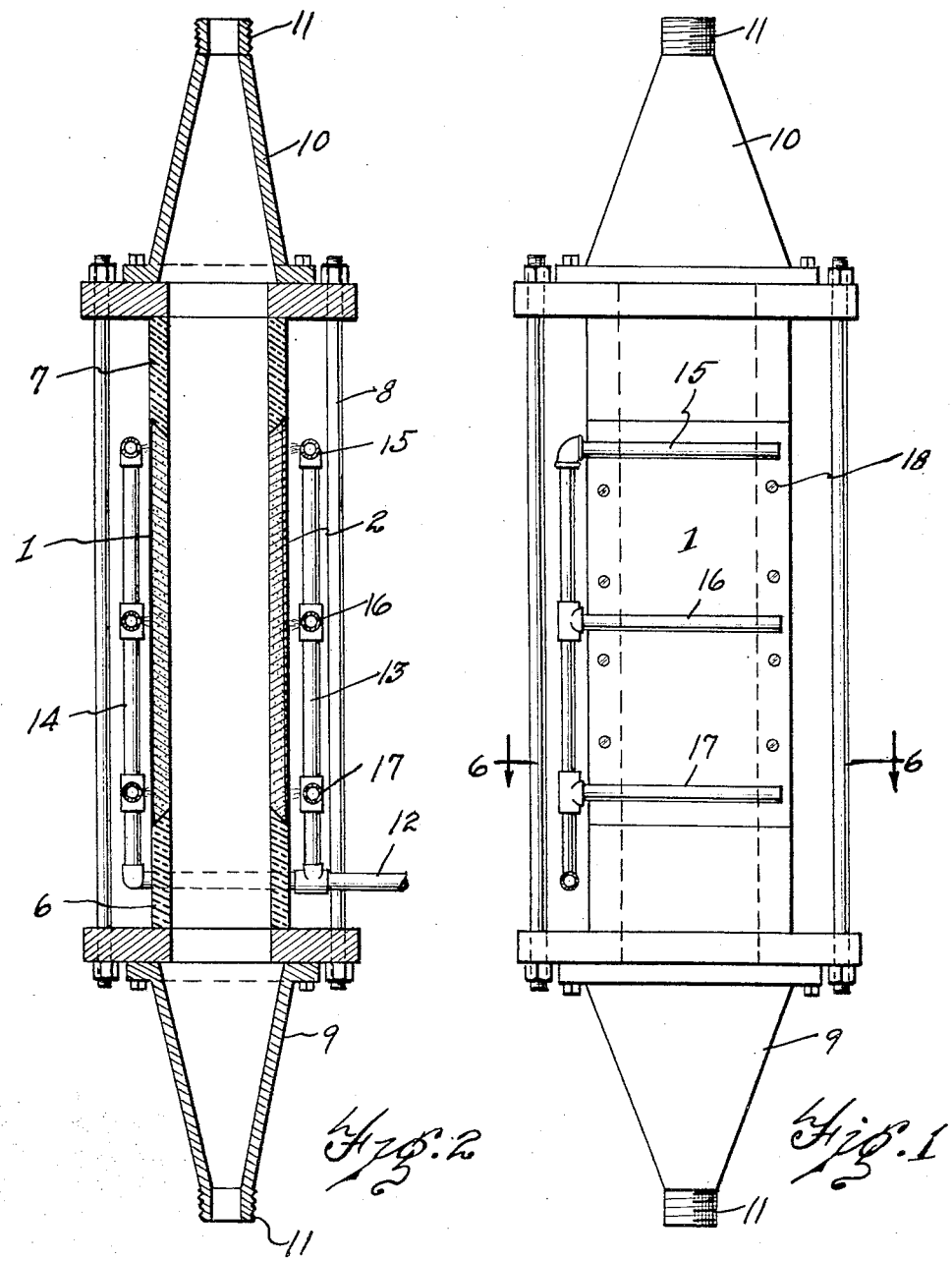

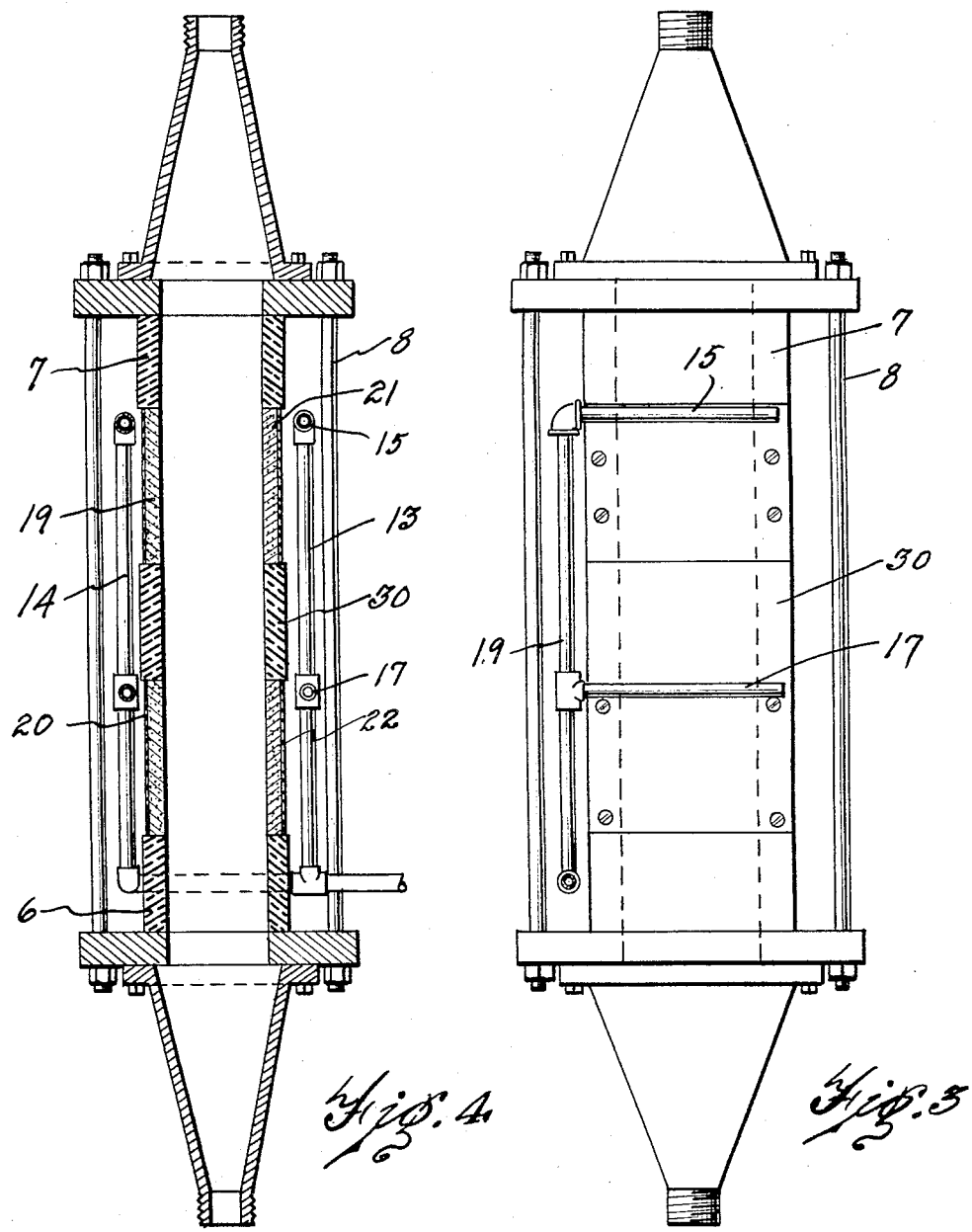

Patented May 1, 1928.

1,668,293

UNITED STATES PATENT OFFICE.

FRANK F. VAN TUYL, OF ANN ARBOR, MICHIGAN.

APPARATUS FOR ELECTRICALLY TREATING LIQUIDS.

Application filed October 1, 1925. Serial No. 59,763.

This invention relates to apparatus for electrically treating liquids such for instance as milk, the purpose being to Pasteurize the liquid and reduce the active bacterial content. An apparatus of this general purpose is shown for instance in the U. S. patent to Harry B. Rudd, No. 1,432,124, and the object of this invention is to provide an efficient means for maintaining the electrodes below a temperature at which the milk or other fluid will coagulate thereon. It has heretofore been the practice, as for instance as shown in the said patent to Rudd, to form a chamber about the exterior of said electrodes and supply the said chamber with water which may flow to and from the chamber. Such method, however, is inadequate for the purpose in that the exterior surfaces of the electrodes are not supplied with cooling water to an equal extent throughout the surface for the reason that water in passing from the inlet to the outlet may take a more or less defined path or course which results in some portions of the surface of the electrode subjected to the water bath not being supplied with equally as cool water as some other portions. My improved cooling means, as hereinafter described, supplies the entire exterior surface of the electrode with water of substantially the same temperature. By my improved means I also avoid possibility of air pockets being formed between the electrodes and the cooling medium which has heretofore in previous constructions resulted in overheating of the electrodes in spots.

A further object of the invention is to provide an apparatus for the electro-purification of milk or other liquid in which both the electrodes are formed of a plurality of parts insulated one from the other whereby the active area of the electrodes may be varied. Milk becomes Pasteurized at certain temperature. The milk supplied to the Pasteurizer may vary in temperature, it commonly varying between 45 degrees F., to 60 degrees F., as supplied to the Pasteurizer. With an electro-purifier having a single pair of electrodes and with the milk or other liquid maintained at the same velocity of flow through the device it will at the one time be heated to too great a degree or at another time insufficiently heated.

By my arrangement of electrodes of a plurality of insulated parts and means for including one or more of the parts of each electrode in the circuit, I am enabled to vary the degree to which the milk is heated in flowing through the Pasteurizer without varying the volume of flow per unit of time. These several objects and novel features of the invention are hereinafter more fully described and claimed, and the preferred form of construction of an apparatus embodying my invention is shown in the accompanying drawings in which—

Fig. 1 is an elevation showing my improved Pasteurizer.

Fig. 2 is a vertical section thereof.

Fig. 3 is a similar elevation of the Pasteurizer in which the electrodes are each formed of several plates.

Fig. 4 is a vertical section of the form shown in Fig. 3.

Fig. 5 is a plan view of the Pasteurizer.

Fig. 6 is a cross section thereof taken on line 6—6 of Fig. 1.

Fig. 7 is a diagram of the electric circuits for the electrodes when used with a two-phase surface main.

Fig. 8 is a diagram of the circuits when used with a three-phase surface main.

The apparatus consists of a shell substantially rectangular in form in cross section in which, as shown in Fig. 6, the electrodes 1 and 2 are provided in opposite side walls and the remainder of the shell is formed of insulating walls 3 and 4. The sides of which the electrodes form a part are completed by insulating portions as shown in Fig. 4 indicated at 6 and 7. This shell is open at each end, as shown in Fig. 4, and the heads are laterally flanged as shown and the upper and lower heads are connected together by the tie rods 8 as will be readily understood from the drawings. Supported on each head respectively are the hollow end members 9 and 10 securely fastened to the said end pieces and registering with the rectangular end openings of the body. The terminals of the end members are shaped to provide a pipe connection 11 in each instance to which the supply and discharge pipe (not here shown) is to be connected. The supply pipe is preferably connected with the lower member 9 and the outlet pipe with the upper member 10 so that the milk flows upward between the electrodes 1 and 2. It is to be understood, however, that the direction in which the flow of fluid through the device is immaterial. Current is to be understood as being supplied to the electrodes in the usual manner and passes from one electrode to the other through the milk or liquid being treated. The liquid, due to its resistance to flow of electric current becomes heated and in the form shown in Fig. 4 the temperature may be regulated by controlling the velocity of flow in passing the electrodes as will be readily understood.

In order to maintain the electrodes below the temperature of the liquid or below that at which milk would adhere thereto, and thereby impart an undesirable flavor to milk passing over such portions, I have provided a cooling device which consists of the supply pipe 12 and the vertical pipes 13 and 14 with which are connected the discharge sections 15, 16 and 17. These discharge sections have fine apertures therein, as will be understood from Fig. 6, and the cooling fluid is discharged against the surface of the plate. Preferably this fluid is water of the desired temperature and by means of the apertured discharge sections the fluid is distributed over the entire area of the electrodes which therefore are uniformly cooled throughout their surfaces. This method of supplying a cooling medium prevents an accumulation of the air between the cooling medium and the outer surface of the electrodes which, in previous forms, was one of the principal difficulties in maintaining the entire area of the electrode at a uniform temperature. While I prefer to use water as a cooling medium, any convenient fluid may be used, as for instance air, in which case the number of discharge sections will probably be increased to insure the entire surface being subjected to an equal flow of cooling element.

The electrodes may be fastened in place by means of screws 18 or in any convenient way. Each electrode may also be formed of several parts. In Figs. 3 and 4 I have shown the electrodes as being formed of two parts 19 and 20 for one electrode and the parts 21 and 22 for the other electrode. An insulating block 30 is placed between the parts of each electrode. These electrodes are to be cooled in the same manner as previously described relative to the form shown in Fig. 4 the same conduits 13 and 14 and the same discharge sections 15 and 17 for cooling medium being shown. In the diagram Fig. 7 is shown the two-phase type of service main and each section 19 and 20 is connected with one side of the circuit by the respective wires 23 and 24 while the electrodes 21 and 22 are connected to the other side of the circuit by the respective wires 25 and 26. In each of the wires for the electrode parts is provided a switch 27 so that any section of the electrode may be cut out of circuit. The purpose of forming the positive and negative electrode of several parts is to provide a means for varying the temperature to which the fluid is raised in passing between the electrodes, and it is preferable to provide a switch in each of the wires leading to each of the electrode parts in order to prevent passage of the current through the fluid from a part of one electrode to more than one part of another electrode. It is also preferable to independently connect each part of each electrode to the source of current supply whereby the electrical potential of the several parts of each electrode is uniform.

The electrodes may be in three parts as is shown for instance in Fig. 8 in which case a three-phase service main is utilized consisting of the wires 40, 41 and 42. The first two elements of the oppositely positioned electrodes are indicated at 43 and 44 and are connected by lines 45 and 46 respectively with the respective lines 40 and 41 of the service main. The second parts 47 and 48 of the two electrodes are connected by the lines 49 and 50 with the wires 41 and 42 respectively and the third parts 51 and 52 are connected by means of the wires 53 and 54 with the respective wires 40 and 42. A switch is preferably provided in each of the wires leading to each part of the electrode, the switch being indicated at 55 for the line 53 and being similarly shown in each of the other lead lines.

As previously stated, the cooling means is of such character that each part of the surface of the electrode is cooled to an equal degree. These electrodes tend to become heated by the passage of the heated milk therebetween and this cooling device is of such capacity as to maintain the electrodes at a temperature lower then the temperature of the milk and thus prevent the adhering of the milk or other fluid being treated to the electrodes. By providing both the positive and negative electrodes of several parts each independently connected with the current supply source greater uniformity of current flow through the milk is secured than if a single large electrode be used of the same area. With a large electrode there is a tendency of the current flowing through some portions of the electrode and not through other portions to an equal extent. By the arrangement of the electrodes of a plurality of parts as described control of the temperature of the fluid being treated is provided enabling the flow of the fluid to be maintained constant and the temperature controlled through variation of the area of the electrode in use and the temperature of the liquid be increased or diminished as the circumstances may require.

The apparatus shown may vary in size and according to the amount of milk or other liquid to be treated per hour and can be supported as a part of the piping system or otherwise as may be deemed desirable. It is further evident that by my improved cooling arrangement the structure is much less expensive than forms heretofore used which require the outer surface of the electrodes to form a part of the wall of a cooling chamber.

The electrodes are preferably formed of carbon, one reason being that the carbon does not tend to impart an undesirable flavor to milk or the like. To assist in cooling thereof a metal of a higher thermal conductivity than carbon is provided on the back of the electrodes and I have indicated this only in Fig. 6 by the line 40. This material to be provided on the outer or cooling surface of the electrode may be applied in any manner found desirable. In order to form a close association of the material with the carbon I form the same by electro-deposition of copper thereon. This copper or other material having a higher thermal conductivity than the carbon will readily absorb the heat from the carbon and will give up its heat more readily than the carbon and therefore by providing the exterior surface of the electrode with a material of a higher conductivity than the carbon the spray device will operate more efficiently than if the electrode were formed of carbon alone. The metal backing for the carbon will also provide a ready means for connection of the electric wires therewith and one of the features of the invention is this provision of carbon electrode with a metal back for the purpose of strengthening the carbon element to prevent fracture thereof and to increase the thermal conductivity. It is to be noted that in the construction shown, the backs of the electrodes are opposed to atmosphere and to some extent may be cooled through contact with atmosphere. The heat transference to atmosphere may be increased by ribbing the metal back of the plate or providing heat radiating projections or fins. This form is not shown in the drawings but will be readily understood by those familiar with the art and such construction either in the metal or the carbon when used without a metal would materially aid in the transference of heat to the cooling element applied in any convenient manner.

In the construction of the electrodes of several parts hereinbefore described, it is advisable to separate the parts by an insulating material of a width positioning the adjacent edges of the parts a distance apart practically equal to the distance between the opposed electrodes. The reason for this is that if each electrode for instance is made of three parts and the central electrode is cut out of circuit and the first and the third electrode are connected in the circuit there is possibility of current leakage from each of these active parts to the middle inactive part if the said middle part is less distance from the active parts of the same electrode than from the opposing parts of other electrode.

Having thus fully described by invention, what I claim and desire to secure by Letters Patent of the United States is—

1. In apparatus for the purpose described, a pair of electrodes in opposed relation between which the liquid to be treated flows and becomes heated due to the flow of electric current through it, a spray device positioned adjacent the outer surface of each electrode, and means for supplying said devices with a cooling fluid.

2. In apparatus for the purpose described, electrodes in opposed relation between which the fluid to be treated flows and is heated due to the flow of the electric current, each electrode being formed of a number of parts in insulated relation, and means for including or excluding any one of the parts of either electrode in or from the circuit.

3. In apparatus for the purpose described, electrodes forming the terminals of an electric circuit and arranged in opposed relation between which the liquid to be treated flows and becomes heated, each electrode being formed of a number of parts in insulated relation, each of the parts of each electrode being connected in the respective side of the circuit, and means for including or excluding one or more of the parts of an electrode in or from the circuit.

4. In apparatus for the purpose described, electrodes forming the terminals of an electric circuit positioned in opposed relation between which the fluid to be treated flows and becomes heated, each electrode being formed of a number of parts in insulated relation, the parts forming each electrode being directly connected with the respective side of the circuit and means for making or breaking the connection for each part.

5. In apparatus for the electrical treatment of liquid, a hollow shell or body adapted for connection at opposite ends in a conduit for liquid, carbon electrodes providing terminals of an electric circuit positioned in opposed relation and between which the liquid flows, said liquid becoming heated due to the flow of electric current therethrough, and means for spraying a cooling fluid over the exposed outer surfaces of the electrodes to maintain in the temperature thereof below the temperature of the liquid passing between the electrodes.

6. In apparatus for the electrical treatment of liquids, a hollow shell or body arranged to receive fluid at one end and discharge fluid at the opposite end, carbon electrodes providing the terminals of an electric circuit and positioned in opposed relation between which the liquid flows, the said liquid closing the circuit between the electrodes and becoming heated due to the flow of electric current, the said electrodes having the outer surface coated with a material of higher thermal conductivity than carbon, and means for supplying a cooling element to the said surface.

7. In apparatus for the purpose described, a pair of electrodes in opposed relation between which fluid to be treated flows and is heated due to the flow of electric current, laterally therethrough, said electrodes being arranged with their exterior surface exposed to atmosphere and means for supplying a cooling element to the exterior surface of the said electrodes to maintain the temperature thereof below that of the fluid passing therebetween.

8. In apparatus for the purpose described, a pair of electrodes in opposed relation forming the terminals of an electric circuit closed by the liquid flowing therebetween, the said liquid becoming heated due to the flow of current therethrough, said electrodes having applied thereto and in intimate association therewith on the exterior surface a material having a greater thermal conductivity than the material of which the electrode is formed, and means for supplying a cooling element to the said surface.

9. In apparatus of the character described, a shell of substantially rectangular form, an electrode in opposite side walls thereof having carbon faces exposed to contact with fluid flowing therethrough, the flow of current through the fluid from one electrode to the other causing the fluid to become heated, and means for varying the effective area of the electrode to increase or decrease the temperature attained by the fluid in passing between the electrodes.

10. In apparatus of the character described, a pair of electrodes in opposed relation between which fluid to be treated flows and becomes heated due to passage of electric current therethrough, said electrodes being formed with a carbon face in contact with the fluid and a metal back, and means for cooling the electrodes.

11. In apparatus of the character described, an open ended chamber through which fluid to be treated is passed at a substantially constant rate of flow, electrodes in opposed fixed relation arranged to provide a part of the passageway for liquid through the chamber, the liquid becoming heated due to passage of electric current therethrough from one electrode to the other, means for varying the effective area of the electrodes to vary the extent of increase in temperature of the fluid in passing therebetween whereby fluid of varying temperature supplied to the apparatus may be discharged therefrom at substantially constant temperature and volume of flow per unit of time.

12. In apparatus for the electro-purification of milk, carbon electrodes forming the terminals of an electric circuit and between the inner opposed faces of which the milk flows and becomes heated, said exterior surface of the electrodes being exposed to atmosphere, and means for discharging cooling fluid against the said exterior surfaces of the electrodes.

13. In apparatus of the character described, a circuit for supplying electric current, a pair of spaced electrodes forming terminals for the circuit and between which liquid to be treated flows, said electrodes being mounted in fixed opposed relation, and means for varying the effective area of the electrodes to vary the degree of temperature attained by the liquid in passing therebetween.

In testimony whereof I sign this specification.

FRANK F. VAN TUYL.